(No Model.) 2 Sheets—Sheet 1.
A. L. WITHERS, Jr.
VELOCIPEDE.
No. 428,737. Patented May 27, 1890.
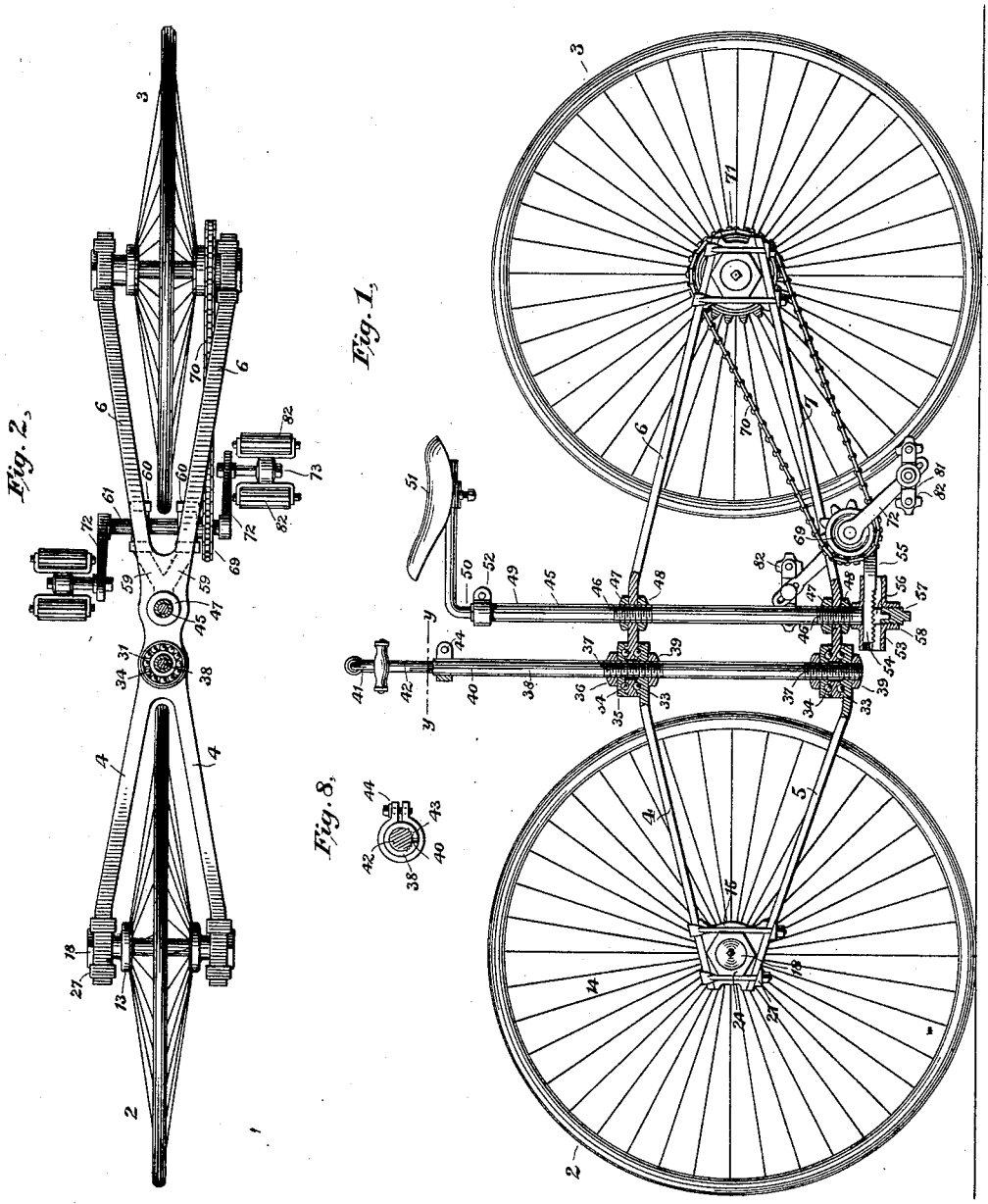
Witnesses
Geo. W. Druck.
Henry W. Lloyd.
Inventor
Addison L. Withers Jr.
By his Attorney
Jacob Felbel (No Model.) 2 Sheets—Sheet 2.
A. L. WITHERS, Jr.
VELOCIPEDE.
No. 428,737. Patented May 27, 1890.
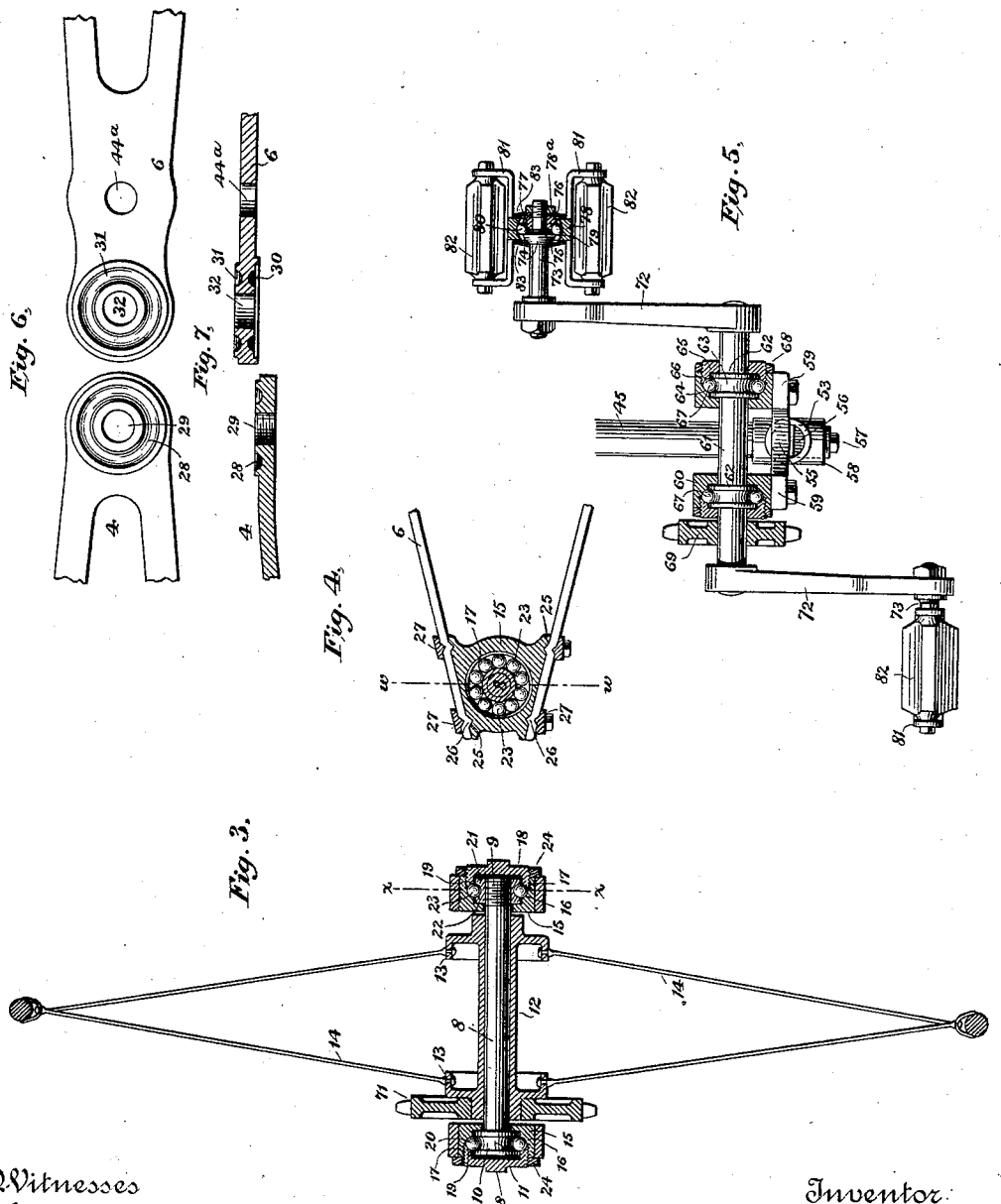
Witnesses
Geo. W. Dreck.
Henry W. Lloyd.
Inventor:
Addison L. Withers Jr.
By his Attorney
Jacob Felbel

UNITED STATES PATENT OFFICE.

ADDISON L. WITHERS, JR., OF PATERSON, NEW JERSEY, ASSIGNOR OF ONE-HALF TO BRITON H. RICHARDSON, OF BROOKLYN, NEW YORK.

VELOCIPEDE.

SPECIFICATION forming part of Letters Patent No. 428,737, dated May 27, 1890.

Application filed August 1, 1889. Serial No. 319,431. (No model.)

*To all whom it may concern:*

Be it known that I, ADDISON L. WITHERS, Jr., a citizen of the United States, and a resident of Paterson, in the county of Passaic and State of New Jersey, have invented certain new and useful Improvements in Velocipedes, of which the following is a specification.

My invention relates more particularly to that class of wheeled machines known as "safety-bicycles;" but some of my improvements are nevertheless adapted for use in other types of velocipedes or wheeled machines.

In the accompanying drawings, illustrating my invention, Figure 1 is a side elevation of a safety-bicycle, some of the parts, however, being shown in section. Fig. 2 is a top view of the same, also partly in section. Fig. 3 is an enlarged vertical section taken through the axle of the rear wheel, or on the plane W W, Fig. 4. Fig. 4 is a similar section taken at the line X X, Fig. 3. Fig. 5 is a vertical section taken through the crank-axle, and showing also in section the mode of attaching the pedals. Fig. 6 is a partial plan view of the front and rear forks. Fig. 7 is a vertical section of the same. Fig. 8 is a cross-section taken at the line Y Y of Fig. 1.

In the various views the same part will be found designated by the same numeral of reference.

2 represents the front wheel and 3 the rear wheel; 4, the upper fork and 5 the lower fork of the front wheel, and 6 the upper fork and 7 the lower fork of the rear wheel. The two sets of forks 4 5 and 6 7 form the framework of the machine. Each fork is made of spring-steel for the purpose of affording a yielding and elastic frame-work, and thus lessening the vibration and strain of the machine and inducing to greater comfort and ease in riding.

The axle of the rear wheel consists of a shank or body portion 8, threaded at 9 at one end and provided at its other end with a head 10, (integral or screwed on,) in which is formed a peripheral groove 11. Surrounding the body portion of the axle and keyed or otherwise secured thereto is a sleeve 12, formed or provided with circular flanges or hubs 13, to which the inner ends of the spokes 14 of the wheel are fastened.

15 15 designate cup-like bearing-plates or supports, each provided with an interior circular groove or depression 16, and each threaded interiorly, as at 17, to receive an exteriorly-threaded nut or cap 18, which at its inner end is formed with a circular groove or depression 19. Within the space formed by the half-round groove 11 and the quarter-round grooves or depressions 16 and 19 is arranged a series of anti-friction balls 20. Upon the threaded end of the shank 8 is screwed a nut or box 21, having formed on its periphery a groove 22. Within the space formed by the half-round groove 22 and the quarter-round grooves or depressions 16 and 19 a set of anti-friction balls 23 are arranged. A binding or lock nut 24 is provided for each cap 18. The front axle and wheel are similarly constructed and mounted.

The upper and lower outer surfaces of the bearing-plates 15 are adapted to support the outer ends of the upper and lower forks of the spring frame-work. In order to make a strong and durable connection between the forks and the bearing-plates and such a one as will prevent any longitudinal movement of the forks, I form notches or seats 25 in the bearing-plates and lugs or projections 26 on the forks adapted to enter said seats, and bind or secure the several parts together by clamps or clips 27, which may be of any desired or approved construction.

The inner ends of the upper and lower front spring-forks 4 and 5 are made alike. Each is provided on its upper side or face with a circular groove 28, and each is formed with a threaded hole 29. The inner ends of the upper and lower rear spring-forks are also made alike, each being provided with a groove 30 on its lower side and a groove 31 on its upper side or face and each formed with a perforation 32. The inner ends of the rear spring-forks overlie the inner ends of the front spring-forks with the grooves 28 and 30 in register. Within the space formed by said grooves is arranged a series of anti-friction balls 33. In each groove 31 another set of anti-friction balls 34 is arranged, and these balls are held in position by a grooved cap 35 and a binding-nut 36, working on the threaded portions 37 of the steering-spindle 38. Preferably the steering-spindle is arranged to screw into the inner ends of the front spring-forks at the threaded holes 29; but in lieu of this construction the said ends of the forks may be welded or otherwise connected or secured to the steering-spindle. Where the parts are arranged to screw together, as shown, I prefer to employ the supporting and locking nuts 39.

The upper end of the steering-spindle is hollow and split, as seen at 40. The handle-bar 41 is provided with a vertical shank 42, which is toothed or serrated, as seen at 43, and which enters the hollow or tubular upper end of the steering-spindle. The shank 42 is held in place by a clamp 44. The interior of the tubular spindle may also be roughened or serrated, as indicated, to enable the shank 42 to be more tightly gripped. By this construction the steering-handles may be adjusted vertically to suit the requirements of the rider, and may be readily and securely locked against turning independently of the steering-spindle.

The rear spring-forks are each provided with a perforation 44ª, through which passes the vertical seat or perch-support 45. This support or standard is threaded at 46 46, and is held firmly to said forks by two pairs of clamping or binding nuts 47 48. The upper hollow end of the standard 45 is split or saw-cut at 49, after the fashion of the steering-spindle, to receive the serrated shank 50 of the frame or bar to which the saddle 51 is adjustably attached. A clamp 52, similar to that marked 44, is employed to secure the parts together when the saddle has been arranged at the desired height.

To the lower end of the vertical standard 45 is screwed or otherwise attached a horizontally-arranged tubular device or support 53, into which is inserted the shank 54 of a bifurcated bracket or support 55. The said shank is toothed or notched on its under side to receive a dog or short ratchet-bar 56, mounted loosely in a carrier-screw 57, adapted to work vertically in a threaded extension 58 of the tubular support 53.

The rear forked ends 59 of the bracket 55 are screwed or otherwise attached to boxes or bearings 60 60 on the crank-axle 61. The latter is provided with two collars 62 62, each having a groove 63 in its periphery, and a groove 64 is formed in each box or bearing 60. Two cup-shaped caps 65, each having a groove 66, are screwed into the boxes or bearings 60, and with said boxes and the collars 62 form bearings for two sets of anti-friction balls 67 67. Lock-nuts 68 are provided to maintain the parts in operative engagement.

Secured to the crank-axle 61 is a sprocket-wheel 69, from which proceeds a drive-chain 70 to and around another sprocket-wheel 71, secured to a boss on the sleeve 12 or hub of the rear wheel.

By the employment of the tubular support 53, the toothed shank 54, and the ratchet-bar 56 simple and efficient means are provided for taking up the slack or stretch of the drive-chain and for making adjustments in the position of the crank-shaft. To adjust the parts it is simply necessary to disengage the ratchet-bar from the toothed shank by unscrewing the ratchet-bar carrier 57 and move the shank and its appendages back or forth the desired distance and then set the parts again by forcing up the ratchet-bar. The toothed shank is preferably made semicircular, as shown at Fig. 5, in order to obtain ample bearing or contact of surface. The cranks are designated by the numeral 72 and the pedal-supporting studs or pins by 73. The latter are provided near their ends with a fast collar or abutment 74, formed with a groove 75, and with a similar collar 76, formed with a groove 77, a nut 78ª on the outer threaded extremity of said studs or pins being provided to maintain the collar 76 in proper position.

Surrounding the collars 74 and 76 is a loose collar 78, having a groove 79, in which and the grooves 75 and 77 is arranged a set of anti-friction balls 80. The groove 79 (or concaved inner surface) in the loose collar is made larger than the grooves 75 and 77 combined, for the purpose of giving to the pedal a lateral, rocking, or side-to-side motion, corresponding to or approximating the motion of a rider's foot. The loose outside collar is made integral with or attached to the pedal-frames 81 81, in which the pedals 82 82 are mounted. 83 83 designate spring-steel disks or washers, which serve as dust-shields for the pedal ball-bearings.

The spring-forks, in lieu of being made of one piece of steel, as shown, may, if desired, be made each of several overlapping pieces, after the fashion of making carriage-springs.

By my improvements vibration of the frame-work is greatly reduced, wheels of greater diameter may be employed and may be set closer together, longer leverage may be obtained, adjustable ball-bearings are employed throughout, and a more facile and convenient and comfortable machine for riding is produced.

What I claim as new, and desire to secure by Letters Patent, is—

1. In a velocipede, the combination, with the front and rear wheels, of a front pair of spring-forks provided each with a groove on its upper face, a rear pair of spring-forks provided each with a groove on its upper and on its lower face, anti-friction balls within said grooves, means for holding the balls and bearings in operative relation, and a steering-spindle connected to the front pair of forks, substantially as set forth.

2. In a velocipede, the combination, with the front and rear wheels, of two pairs of spring-forks pivotally connected together by ball-bearings, substantially as described, a steering-spindle connected to the front pair, and a seat-standard secured to the rear pair, substantially as set forth.

3. In a velocipede, the combination of a split tubular steering-spindle, a steering-handle shank having a serrated surface, and a clamp for holding the two rigidly together, substantially as set forth.

4. In a velocipede, the combination of the seat-standard provided at its lower end with the horizontally-arranged tubular support 53, a bracket 55, supporting the treadle mechanism and provided with a horizontally-arranged serrated shank, and a tooth or ratchet-bar connected to a carrier 57, adapted to work vertically in an extension of the tubular support, substantially as set forth.

5. In a velocipede, the combination of the seat-standard provided at its lower end with a tubular support, a bracket supporting the treadle mechanism provided with a serrated shank, and a ratchet-bar or tooth in said tubular support for engaging with said serrated shank, substantially as set forth.

6. In a velocipede, the combination of the crank-pin, the grooved collars thereon, the anti-friction balls, the pedal-frame, and the loose outside collar grooved on its inner side to afford a side rocking or lateral movement for the pedal-frame, substantially as set forth.

7. In a velocipede, the combination of the crank-pin, the grooved collars thereon, the anti-friction balls, the pedal-frame, the loose outside collar, and the dust-shield, substantially as set forth.

8. In a velocipede, the combination, with the front and rear wheels, of a bearing-plate on each side of each wheel, and two pairs of spring-forks supported at their outer ends on said bearing-plates and pivotally connected together at their inner ends by ball-bearings, substantially as set forth.

9. In a velocipede, the combination, with the front and rear wheels, of a bearing-plate on each side of each wheel provided with notches or depressions, and two pairs of spring-forks provided with lugs or projections, substantially as set forth.

10. In a velocipede, the combination of a shaft or axle threaded at one end and provided at its other end with a head having a peripheral groove, the cup-like bearing-plates or supports 15, each provided with an interior circular groove and each threaded interiorly, the exteriorly-threaded nuts or caps 18, having each a circular groove or depression 19, the peripherally-grooved nut or box 21, and the anti-friction balls, substantially as set forth.

Signed at New York city, in the county of New York and State of New York, this 31st day of July, A. D. 1889.

ADDISON L. WITHERS, JR.

Witnesses:
JACOB FELBEL,
PHILLIPS ABBOTT.